Oct. 17, 1933.    A. MITCHELL    1,931,079
LIP STICK
Filed May 18, 1932
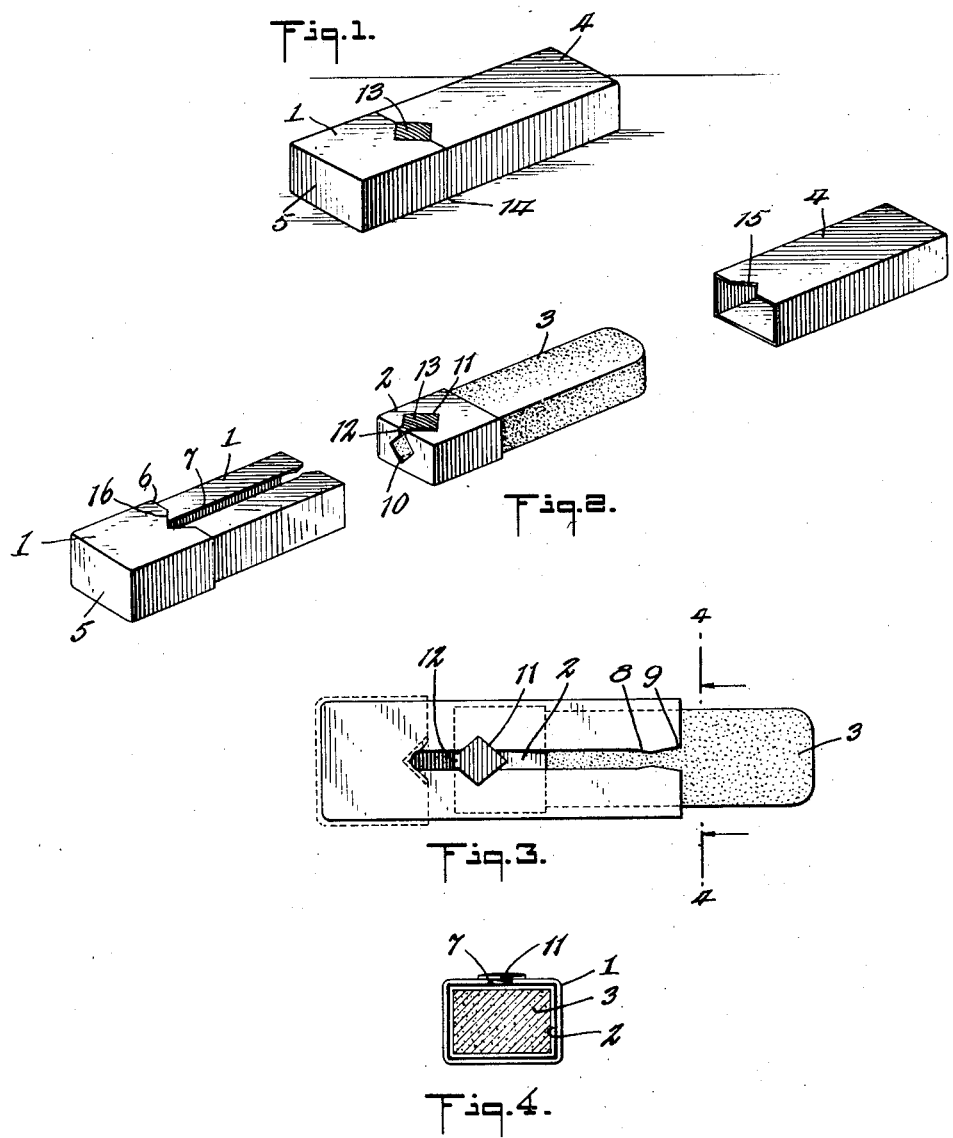
INVENTOR
August Mitchell
BY
ATTORNEY Patented Oct. 17, 1933

1,931,079

UNITED STATES PATENT OFFICE 1,931,079

LIP STICK

August Mitchell, New York, N. Y., assignor to Scovill Manufacturing Company, Waterbury, Conn., a corporation of Connecticut Application May 18, 1932. Serial No. 611,958

5 Claims. (Cl. 206—56)

This invention relates to certain improvements in holders for cosmetics, having been particularly designed for containers for rouge and the like commonly known as lipsticks.

In this class of containers, the construction usually includes a body member, a cosmetic holder or cup, and a cover, and the holder or cup is given a longitdudinal movement in the body, this latter member being provided with a slot, and the holder with a nib or projection for sliding the holder in the slot of the body. This nib has usually been provided by slitting the side of the holder and bending the slit metal to form the nib or finger-piece. This required one operation. Furthermore, the bottom of the holder was provided with a hole so that when the holder was filled air could escape and permit the holder to be properly filled with the cosmetic. This required a separate operation. In addition, as the metal of the holder shells was very thin, the metal forming the finger-piece was not strong and was liable to be broken off. It also protruded in an objectionable manner and was apt to catch in the pocketbook or the purse of the user.

It is the especial object of the present invention to provide a lipstick container in which the holder is formed with an integral finger-piece which is produced by cutting out the bottom of the holder and forming this up to produce the finger-piece, so that only one operation, instead of two, is necessary in producing the hole in the bottom of the container and the finger-piece.

It is a further object of the invention to so cut out the finger-piece that it will lie substantially flat against the container, overlapping the sides of the slot, and so that it may be formed in various shapes for decorative purposes.

With these and other objects not specifically referred to in view, the invention consists in certain novel parts, arrangements and combinations which will be described in connection with the accompanying drawing and the novel features pointed out in the claims annexed hereto.

In the drawing,—

Figure 1 is an assembled perspective view of the improved container, with the cover in place;

Figure 2 is a similar view of the different parts of the container;

Figure 3 is a top view of the container with the cover removed, and

Figure 4 is a cross-section taken on the line 4—4 of Figure 3.

Referring now to the drawing, the particular container selected to illustrate the invention is shown as rectangular in form, but it will be understood that the invention is adapted to other shapes.

The container shown, however, comprises a body 1, a cosmetic holder or cup 2 adapted to hold a cosmetic stick 3, and a cover 4, as clearly shown in Figure 2.

The body of the container is formed with a closed end 5 which is slightly inset to form a shoulder or stop 6, against which the end of the cover abuts when the parts are closed, as shown in Figure 1.

The body 1 is formed with a longitudinal slot 7 in which the holder 2 is adapted to have a to and fro longitudinal movement to project and retract the stick of rouge or other cosmetic when the cover is removed. The body 1 is preferably made of thin sheet metal so as to be resilient, and the slot 7 is formed with a somewhat restricted opening 8 which acts as a stop to prevent the holder 2 from being accidentally removed from the holder when projected for use, and the slot beyond the restricted opening 8 is flared outwardly, as indicated at 9, to permit ready assembly of the parts, the metal of the body yielding sufficiently to permit the holder 2 to be inserted in the body.

In accordance with the invention, the holder or cup 2 has its bottom cut or stamped out to form an aperture 10 and a finger-piece 11, this finger-piece being formed by bending or forming up the cut out metal so as to produce a neck-piece 12 and the finger-piece 11, which is, as shown, preferably flat, or substantially flat, being provided, if desired, with a milled surface 13 to effect a ready grip for the finger of the user in manipulating the parts.

It will be observed that the aperture 10, which, as before stated, is desirable in this type of container, and the finger-piece may be formed at one operation. Furthermore, the finger-piece is, as shown, see particularly Figures 3 and 4, substantially flat so as to present no projecting parts, and is wide enough so that it overlaps the edeges of the slot 7, thus making a strong and rigid structure. Furthermore, this finger-piece may be made in various shapes. In the particular construction shown it is diamond shaped, but the bottom of the holder 2 may be cut so that this finger-piece may be made in practically any desired ornamental shape.

It is desirable, of course, that when the parts are closed the cover and the body should closely abut, as indicated at 14 in Figure 1, and to present a smooth and attractive appearance the parts should come together in what may be termed a close fitting relation, as shown in Figure 2. The cover and the body will therefore be provided with cut out portions, as indicated at 15 and 16 in Figure 2, to receive the particular form of finger-piece which may be used in connection with the holder, the particular construction shown illustrating V-shaped cut outs to receive the diamond shaped finger-piece.

It will be seen with the construction shown and described that a very simple and at the same time strong lipstick holder has been provided, one in which there are no projecting parts which might catch in the pocketbook or pocket of the user, and in which the finger-piece, due to its overlapping on the sides of the slot in the body, forms a strong construction. The number of operations necessary for producing the stick are reduced, thereby providing for an economical construction, and at the same time a durable and attractive article is produced.

While the invention has been shown and described in its preferred form, it will be understood that certain changes and variations may be made in the construction shown and described without departing from the invention as defined in the appended claims.

What is claimed is:

1. In a lipstick holder, the combination of a body having a longitudinal slot and an open end, a paste holder movable to and fro in the body, a member cut out from the bottom of the holder leaving an aperture therein for the escape of air when the paste holder is being filled and formed to provide a part engaging in the slot of the body and a relatively flat finger-piece extending above the slot and at an angle to the bottom of the paste holder, and a cover for the open end of the body.

2. In a lipstick holder, the combination of a body having a longitudinal slot and an open end, a paste holder movable to and fro in the body, a member cut out from the bottom of the holder leaving an aperture therein for the escape of air when the paste holder is being filled and formed to provide a relatively flat finger-piece extending on opposite sides of the slot and adjacent one side of the paste holder, and a cover for the open end of the body.

3. In a lipstick holder, the combination of a body having a longitudinal slot and an open end, a paste holder movable to and fro in the body, a part cut out from the bottom of the holder leaving an opening for the escape of air when the paste holder is being filled and formed to provide a relatively flat finger-piece overlapping the edges of the slot and disposed along one side of the paste holder and at an angle to its bottom, a cover for the open end of the body, and recesses in the body and the cover to receive the finger-piece when the parts are in closed position.

4. In a lipstick holder, the combination of a body having a longitudinal slot and an open end, a paste holder movable to and fro in the body, a part cut out from the bottom of the holder forming a neck engaging in the slot and a finger-piece overlapping the edges of the slot and disposed at an angle to the bottom of the paste holder, a cover for the open end of the body, and means for positioning the finger-piece so that the body and cover may be assembled with a flush joint.

5. As an article of manufacture, a paste holder for use with lipstick holders which have a body portion with a longitudinal slot in one side, said paste holder having a member cut out from its bottom and bent at an angle to the bottom and alongside one side of the paste holder, said cut out member having a part engaging in the slot of the lipstick holder, and a relatively flat finger piece extending above the slot.

AUGUST MITCHELL.